United States Patent [19]

LeGrand et al.

[11] 4,251,562

[45] Feb. 17, 1981

[54] METHOD FOR PRODUCING AN EDIBLE GEL

[76] Inventors: Charles G. G. R. LeGrand, "Les Ombrages III" 14, Avenue de Creully, Caen (Calvados); Roger A. E. C. Paul, Saint Etienne La Thillaye, Calvados, both of France

[21] Appl. No.: 949,543

[22] Filed: Oct. 10, 1978

Related U.S. Application Data

[63] Continuation-in-part of Ser. No. 696,378, Jun. 15, 1976, abandoned.

[30] Foreign Application Priority Data

Jun. 20, 1975 [FR] France ............................ 75 19373
Mar. 31, 1976 [FR] France ............................ 76 09388
Apr. 13, 1976 [FR] France ............................ 76 10835

[51] Int. Cl.$^3$ ........................ A23L 1/04; A23C 21/00
[52] U.S. Cl. ................................. 426/573; 426/580; 426/583
[58] Field of Search ................ 426/583, 580, 41, 588, 426/573

[56] References Cited

U.S. PATENT DOCUMENTS

| 2,383,070 | 8/1945 | Mook ................................. 426/588 |
| 3,689,288 | 9/1972 | Daren ................................. 426/573 |
| 3,852,496 | 12/1974 | Weetall et al. ........................ 426/41 |

OTHER PUBLICATIONS

Webb et al., By Products from Milk, 2nd Ed., The Ali Publ. Co., Inc., Westport, Conn., 1970, (pp. 83–123, 230–233 & 250–255).
Fenton–May et al., Concentration and Fractionating of Skim Milk by Reverse Osmosis and Ultrafiltration, J. Da. Sci., vol. 55, No. 11, 1972, (pp. 1561-1566).

*Primary Examiner*—David M. Naff

[57] ABSTRACT

A gel having rheology characteristics comparable to those of an egg-white gel or a gelatin gel is prepared by forming a mixture of a sol of seroprotein such as whey protein, glucides such as saccharose or hydrolyzed lactose and water, and heating the mixture under pressure at a temperature and for a time sufficient to convert the mixture into a gel.

11 Claims, No Drawings

METHOD FOR PRODUCING AN EDIBLE GEL

RELATED APPLICATION

This is a continuation-in-part of application Ser. No. 696,378, filed June 15, 1976, now abandoned the contents of which are incorporated herein by reference.

SUMMARY

This invention provides a process wherein there is formed a mixture of a sol of seroproteins, glucides (sugars) and water, the mixture so formed being subjected to heat and pressure conditions for a period of time to form a homogeneous, stable, uniform gelled milk product. Under very strong magnification using an electron microscope, the gels show a highly organized, non-reticular structure.

The rheological characteristics of the gel may be varied by extending the time of heating; the more heat generated under suitable pressures, the more rigid the gel. Additives (colorants and flavors) may be added to the mixture before formation of the gel.

BACKGROUND OF THE INVENTION

The invention relates to a method for the manufacture of homogenous, gelled milk products such as custards, creams, ice creams, candies and the like which have excellent shelf life.

In the production of cheese, considerable by-products remain which at present are either unusable, or usable at best only as supplements for animal feed. Presently available milk products have limited shelf-storage or usable life. It is one objective of the present invention to make use of such milk and cheese by-products for producing edible gelled milk products which have high nutritive value, and which may economically be produced and which have long storage life.

Two of the presently available by-products are (1) a sol of seroprotein derived from sweet lactoserum and (2) ultrafiltrates of whole or sweet skimmed milk containing lactose. The sol of seroprotein is prepared by subjecting the sweet lactoserum of pH, preferably higher than 5.8 and lower than 7.0 to ultrafiltration, reverse osmosis, dialysis, electrodialysis, etc, such techniques being known in the art. The sweet lactoserum from which the sol of seroprotein is derived is obtained, for example, as one of the components resulting from cheese making processes. Typically one starts with milk and adds rennet thereto. The rennet causes the milk to coagulate to a solid portion, (commonly known as "curd"), which for the most part represents the casein portion of the milk and a liquid portion which contains water, lactose, inorganic salts and soluble seroproteins. In the industry this liquid portion is generally known as "whey". As heretofore mentioned the sweet lactoserum is then subjected to, for example, ultrafiltration by utilization of appropriately sized filter screens and/or diaphragms thus resulting in a separation of the lactose and inorganic salts from the seroproteins sol. The lactose-inorganic salt fraction, sometimes called the "ultrafiltrate" is subsequently hydrolyzed to a degree of between about 75-95 percent lactose completion. According to this invention such hydrolyzed lactose may be used as the glucide, or it may be used with saccharose. Lactose when hydrolyzed converts to a glucose and galactose which have a sweet taste, as compared to the blend or non-sweet taste of the unhydrolyzed product.

The present invention enables commercial use of the aforementioned by-products in the manufacture of nutritionally edible products in gelled form as more fully hereinafter described.

DETAILED DESCRIPTION

This invention concerns a process of manufacturing gelled milk products comprising admixing or forming a mixture of (a) a sol of sero-proteins containing from about three percent to about seven percent protein, (b) a glucide having a dry solid content of about twenty percent to forty percent and being selected from the group consisting of saccharose, an ultrafiltrate of sweet milk, the lactose of said ultrafiltrate being about seventy-five percent-ninetyfive percent hydrolyzed, and mixtures thereof, and (c) water in amount of between about forty percent and seventy percent by weight, heating this mixture under pressure at a temperature between eighty degrees C and one hundred forty degrees C for a time, depending on the pressure employed, ranging from about thirty minutes to less than five minutes.

The milk products of this invention are normally put into small containers, i.e. containers, cans or other appropriate receptacles of about five hundred milliliter or less capacity. Such volume represents easy handling of the product during processing and is of such size as to represent an individual portion suitable for ingestion.

The behavior of seroproteins when subjected to heat is of significance in a better understanding of this invention. Casein functions as a protective colloid for seroproteins (lactobumins and lactoglobulins) in milk, thus making it possible to heat milk without forming a flocculate. The seroproteins in the absence of substantial amounts of casein, e.g. six to ten parts of casein to one part of seroprotein, will foam and coagulate to form a flocculate when heated to more than seventy degrees C.

We have found that, when present in sufficient concentration, a glucide such as saccharose will act as a protector of the seroproteins and that a mixture of seroprotein containing saccharose will retain its original opalescent appearance. However, upon merely heating a sol of seroprotein containing saccharose (to 100 degrees C. and even higher) without subjecting the mixture to pressure, one obtains a poorly organized coagulate having enormous synerisis.

In accordance with the present invention, we have now discovered that is a sol of seroproteins, mixed with water, a glucide such as saccharose, or an unfiltrate of sweet milk, if subjected in a sealed vessel, to a temperature equal to or greater than eighty degrees C. to a pressure greater than atmospheric, the actual pressure depending on the heating temperature, we surprisingly obtain a pure well defined gelled product of a rheology somewhat comparable to that of an egg-cream or an heated egg white.

Rheology is the science of the deformation and flow of matter. As used herein we are referring to the rigidity, firmness and elasticity of the gel. Empirically observed the gelled product of this invention, when cut with a knife, does not collapse, and the gel does not stick to the knife. At the opposite extreme, gels may have a high degree of rigidity, comparable with concentrated gelatine gels. Characteristically the degree of rheology indicates the difference between gels and products which may be called creams. We control the rheology of our products through the use of appropriate product mixes and controlled heat, time and pressure conditions to form a gel having the general consistency of a boiled egg white, this consistency being pleasing to the palate.

As already mentioned, the glucide component can be an ultrafiltrate of sweet milk (whole or skimmed), advantageously demineralized, and whereof the lactose content has been partially or entirely hydrolyzed. Such ultrafiltrate can be employed as a total or partial replacement for the saccharose.

Demineralization of the ultrafiltrate is not essential, but it is preferred, so as to respect a mineral equilibrium. Accordingly, the ultrafiltrate, when employed, can be totally, partially, or not at all demineralized.

Demineralization may be effected for example by electrode dialysis techniques known in this art. Controlled demineralization results in removal of the monovalent ionic minerals, these generally having a more bitter salt-like flavor then the polyvalent minerals which are retained. Generally it is preferred to demineralize to a degree of some forty to sixty percent of the total mineral content.

As to hydrolysis of the lactose, between seventy-five percent and ninety-five-one hundred percent hydrolysis again developes the desired sweetened flavor of this component and also prevents crystalization of the lactose.

The ultrafiltrate before it is used, should be concentrated to increase its solid content. The product having about seventy-seventy-five percent dry solids by weight is quite satisfactory, and permits easy determination of the amount of water which is subsequently required to produce the gelled products of this invention.

The seroprotein sols used according to this invention contain about three percent to about seven percent protein on a dry weight basis. Thus of the total dry material content of the mixtures utilized, the protein content generally constitutes less than ten percent. In a preferred composition the dry weight ratio of protein to saccharose would be about 1 to 6.

According to the invention, the mixture, formulated by mixing the components in suitable mixing means, is heated under pressure, greater than atmospheric, in hermetically sealed vessels or open vessels with over pressure of air or inert gas at a temperature of between eighty degrees C. and one hundred forty degrees C. The heating of the mixture can thus occur either in static (still) or in dynamic (moving) state as may be desired in practice and based on availability of equipment. In the case where hermetically sealed or closed containers are used, the component mixture is placed in the container, the container is sealed, and it is then placed in a suitable apparatus, e.g. an autoclave. The autoclave is then heated and pressurized in suitable relationship depending on the heating period. If short heating time is used the autoclave may be heated to one hundred forty degrees C. For a longer heating time one would use, for example, a temperature of about one hundred ten degrees C. The gelling of the product would commence during autoclaving and would be completed when cooling off to the ambient temperature. This might be denoted as a discontinuous operation.

According to another case, using what we would call a continuous operation, the mixture of seroprotein sol, glucide, and water would be pumped or otherwise transferred in a dynamic state, for example, to a sterilizer heated to a temperature of about one hundred forty degrees C., and instantaneously cooled off at less than $+100°$ C. (in a way similar to the process UHT) and conditioned in immediately closed containers in which the physical organization of the gel is accomplished. Said physical organization is finished when reaching the ambient temperature.

The heating time may vary according to the combination of pressure and temperature employed. At higher temperatures and pressures the time required could be less than five minutes, while at lower temperature-pressure combinations the heating time could be about thirty minutes. Obviously, the specific combinations of heat, pressure and time will vary according to the specific admixture employed. The conditions selected should be those which prevent ebullition which would interfere with the formation of the true homogenous gel of the present invention.

When it is desired to limit or avoid Maillard's reaction, it is well to limit the heating temperature to one hundred four degrees C. and, in compensation, to extend the heating time.

EXAMPLES OF THE INVENTION

In the following examples, the composition is indicated as part by weight for one kilogram of finished product.

EXAMPLE 1

442 parts of a sol of seroproteins having a 13% dry solids content, 59% of the solids being protein, was mixed with 320 parts of saccharose and 238 parts of water. The mixture, thus formed, was placed in hermetically sealed containers being small cans of about 250 gram capacity and heated in an autoclave for about five minutes at about 110 degrees C. Gelling started during this period and, upon removal from the autoclave, continued until a homogenous, well organized gelled product was obtained. It should be noted that according to the practice of this example, small containers were employed.

This was done to insure adequate heat transfer from the exterior of the containers through the static mass contained therein, thus producing a homogenous gel formation through-out the composition.

EXAMPLE 2

The procedure of example 1 was followed except for substituting for the saccharose an equivalent amount of an ultrafiltrate of sweet milk having a dry solid content on a weight basis of 70% hydrolyzed lactose (glucose plus galactose) and 2% minerals. The same type of homogenous, well organized gelled product was obtained.

EXAMPLE 3

A mixture of the ultrafiltrate and saccharose was employed as the glucide component for this example. The seroprotein sol, glucide component and water was treated in a sterilizer according to the previously described continuous or dynamic method employing a temperature of about 140 degrees C. and a pressure of about two bars. The gelling commenced in the sterilizer, and upon transferring the initially gelled material to open containers, the gelling was completed at ambient temperatures. Again the product was homogenous and of a well organized gelled consistency having the desirable rheology heretofore mentioned.

In the examples above, the sol of seroprotein is in very low concentration in terms of a dry solid basis. The glucides, either saccharose or ultrafiltrate are at concentrations, allowing, when cold, the perfect solubility of the seroproteins, and when warm, the perfect organization of the gel. These two components may be used in various concentrations within the ambit of this invention. They may even be employed as substantially dry components, water having been removed by known techniques. In the latter situation, the present process can be practiced by the addition to the dry components of a suitable quantity of water at locations remote from the places of production of the starting material. Moreover, such drying permits packaging of the starting material for later use by the consumer who may form the gel product by adding water to the starting materials in a pressure cooker.

Homogenized gels may be prepared in appropriate industrial or domestic appliances which make it possible to obtain a stable cream which can be used as a semi-preserver. Such a cream can be consumed as is, or be dried by lyophilization, after which it would have the appearance and texture of meringue biscuits.

The gels of the invention, as produced, when placed in a freezer or refrigerator, are transformed into a product which is a soft, smooth and rich ice cream, it being unnecessary to use an ice-cream freezer, this being a consequence of the stability of the gel, both cold and at ambient temperature. On the other hand, the gel as produced, before being placed in the preezer or refrigerator, may be placed in a homogenizer or mixer for producing a cream.

As mentioned earlier, additives (colorants and flavors) may be incorporated in the mixture before gel formation. Control of calcium content is also useful in controlling the rigidity of the gelled product, increasing calcium content producing more rigid gels.

Various embodiments, modifications and changes have been described. Other such variations will be obvious to those skilled in the art. Accordingly it is intended that the foregoing disclosure be taken as illustrative and not as limiting of the invention.

We claim:
1. Method for making a gel having rheology characteristics comparable to those of an egg-white gel or a gelatin gel, comprising forming a mixture of

(a) a sol of whey proteins containing about 3% to about 7% of whey proteins on a dry weight basis, said whey proteins being substantially separated from lactose and inorganic salts present in whey,
(b) glucides having a dry solid content of about 20% to about 40% based on the total weight of the mixture, and chosen from the group consisting of saccharose, an ultrafiltrate of sweet milk whose lactose content was hydrolyzed to the extent of 75-95% and mixtures of these products, and
(c) added water in an amount of about 40% to about 70% based on the total weight of the mixture, said mixture containing less than 10% of proteins on a dry weight basis, and heating the mixture at a pressure sufficient to avoid boiling in the range between about one and three bars, at a temperature of between 80° C. and 140° C. for a time which is shorter as the temperature is higher of about 30 minutes or less.

2. A process according to claim 1 wherein the ultrafiltrate has been 40-60% demineralized.

3. A process according to claim 1 wherein said mixture is heated in a closed vessel.

4. A process according to claim 1 wherein said mixture is heated in an open vessel at an over-pressure.

5. A process according to claim 1 wherein the mixture is heated to a temperature not exceeding 104 degrees C.

6. A process according to claim 1 wherein the mixture is heated in a static state.

7. A process according to claim 1 wherein the mixture is heated in a dynamic state.

8. A process according to claim 1 wherein color forming additives are incorporated.

9. A process according to claim 1 wherein flavor forming additives are incorporated.

10. A process according to claim 1 in which the mixture comprises 442 parts of a sol of whey protein having a 13% dry solids content of which 59% is protein, 320 parts of saccharose, and 238 parts of water, all parts being parts by weight of the total mixture.

11. The gelled product prepared according to the process of claim 1.

* * * * *